United States Patent
Garvin et al.

(10) Patent No.: US 10,520,955 B2
(45) Date of Patent: *Dec. 31, 2019

(54) VEHICLE CONTROL SYSTEM WITH TRACK TEMPERATURE SENSING

(71) Applicant: Deere and Company, Moline, IL (US)

(72) Inventors: Daniel Garvin, Cedar Falls, IA (US); Ronica L. McKinley, Milan, IL (US); Narasimhan Rangan, Cedar Falls, IA (US); Janet R. Willett, Cedar Falls, IA (US); Bruce L. Upchurch, Watertoo, IA (US); Jeremy P. L'heureux, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/997,458

(22) Filed: Jun. 4, 2018

(65) Prior Publication Data

US 2018/0364744 A1 Dec. 20, 2018

Related U.S. Application Data

(63) Continuation of application No. 15/265,209, filed on Sep. 14, 2016, now Pat. No. 9,989,976.

(Continued)

(51) Int. Cl.
*G05D 13/66* (2006.01)
*B60K 31/00* (2006.01)
(Continued)

(52) U.S. Cl.
CPC ............ *G05D 13/66* (2013.01); *B60K 31/00* (2013.01); *B60W 30/146* (2013.01);
(Continued)

(58) Field of Classification Search
None
See application file for complete search history.

(56) References Cited

U.S. PATENT DOCUMENTS

| | | | |
|---|---|---|---|
| 3,153,371 A * | 10/1964 | Miller | F01C 19/08 418/133 |
| 5,587,698 A * | 12/1996 | Genna | B60C 23/003 340/442 |

(Continued)

FOREIGN PATENT DOCUMENTS

| | | |
|---|---|---|
| EP | 3153371 A1 | 4/2017 |
| WO | 2017000068 A1 | 1/2017 |
| WO | WO2017049393 | 3/2017 |

OTHER PUBLICATIONS

U.S. Appl. No. 62/185,995, filed Jun. 29, 2015, priority document for WO2017000068 filed on Jan. 5, 2017 to Camso.

*Primary Examiner* — Tyler J Lee
(74) *Attorney, Agent, or Firm* — Rathe Lindenbaum LLP

(57) ABSTRACT

A work vehicle may include an engine, a drive train driven by the engine, and a track system including at least one track. The track system is connected to the drive train. The work vehicle may further include a temperature sensor configured to sense a track temperature of the at least one track and a vehicle control system configured to receive the track temperature and to determine misalignment of the at least one track based at least in part upon the sensed track temperature.

20 Claims, 5 Drawing Sheets

Related U.S. Application Data

(60) Provisional application No. 62/271,148, filed on Dec. 22, 2015.

(51) Int. Cl.
| | |
|---|---|
| *B62D 55/08* | (2006.01) |
| *B60W 30/14* | (2006.01) |
| *E02F 9/02* | (2006.01) |
| *B62D 55/10* | (2006.01) |
| *B62D 55/24* | (2006.01) |
| *B62D 55/32* | (2006.01) |
| *E02F 9/26* | (2006.01) |
| *B62D 55/02* | (2006.01) |
| *B62D 55/065* | (2006.01) |

(52) U.S. Cl.
CPC ............ *B62D 55/08* (2013.01); *B62D 55/10* (2013.01); *B62D 55/244* (2013.01); *B62D 55/32* (2013.01); *E02F 9/02* (2013.01); *E02F 9/268* (2013.01); *B60K 2031/0091* (2013.01); *B60W 2300/152* (2013.01); *B60W 2300/158* (2013.01); *B60W 2300/44* (2013.01); *B60W 2420/20* (2013.01); *B60W 2420/40* (2013.01); *B60W 2720/103* (2013.01); *B62D 55/02* (2013.01); *B62D 55/0655* (2013.01); *B62D 55/24* (2013.01)

(56) References Cited

U.S. PATENT DOCUMENTS

| | | | | |
|---|---|---|---|---|
| 5,927,412 | A * | 7/1999 | Crabb | B62D 55/108 180/9.44 |
| 7,043,973 | B2 * | 5/2006 | Shepherd | B60C 23/20 73/146 |
| 8,985,250 | B1 * | 3/2015 | Lussier | B62D 11/003 180/9.1 |
| 9,033,431 | B1 | 5/2015 | Zuchosky et al. | |
| 9,228,875 | B2 | 1/2016 | Lingle et al. | |
| 2007/0126286 | A1 | 6/2007 | Feldman et al. | |
| 2009/0173839 | A1 | 7/2009 | Groeneweg et al. | |
| 2009/0234522 | A1 | 9/2009 | Dexanzo | |
| 2015/0042152 | A1 * | 2/2015 | Lussier | B62D 55/125 305/165 |
| 2015/0269722 | A1 | 9/2015 | Naithani | |
| 2015/0321710 | A1 | 11/2015 | Zuchoski | |
| 2016/0318564 | A1 | 11/2016 | Brinkley | |
| 2017/0087987 | A1 | 3/2017 | Vik | |

* cited by examiner

VEHICLE CONTROL SYSTEM WITH TRACK TEMPERATURE SENSING

RELATED APPLICATIONS

This application claims priority from co-pending U.S. patent application Ser. No. 15/265,209 filed on Sep. 14, 2016 by Garvin et al. and entitled VEHICLE CONTROL SYSTEM WITH TRACK TEMPERATURE SENSING which claims party from U.S. Provisional App. Ser. No. 62/271,148, which was filed Dec. 22, 2015, wherein the entire contents of both applications are hereby incorporated by reference for all that they teach.

TECHNICAL FIELD

The present disclosure generally relates to a system and method of detecting a track temperature issue and/or controlling a vehicle, such as an agricultural tractor, based on a track temperature.

BACKGROUND

The rubber tracks of tracked machines may overheat during operation, especially when the tracked machine is carrying a heavy load, is operating at high speeds, or when the track is misaligned. Tracks may heat up quickly in a particular area, such as the treadbars. Transporting large hitch loads at top speeds may cause the track (e.g., the treadbars) to overheat and fail. To prevent overheating of the track, failure of the track, and/or damage to the track, the maximum speed of the vehicle can be restricted in all operating conditions (e.g., blanket speed restriction).

SUMMARY

Various aspects of examples of the present disclosure are set out in the claims.

According to an aspect of the present disclosure, a work vehicle such as a tractor or agricultural combine is disclosed that includes an engine, a drive train driven by the engine, a track system including at least one track, the track system connected to the drive train, a temperature sensor configured to sense a track temperature of the at least one track, and a vehicle control system configured to receive the track temperature and configured to control the speed of the vehicle based on the track temperature. The vehicle may also include an operator alerting apparatus for alerting an operator of a speed condition or a track condition. The vehicle control system may be configured to restrict the speed of the vehicle based on the track temperature. The vehicle control system may limit the speed of the vehicle The at least one track may include a carcass, a plurality of treads, and a plurality of lugs, the temperature sensor may be positioned at least partially within at least one of the plurality of lugs, at least one of the plurality of treads, and/or the carcass. The temperature sensor may be a non-contact sensor that is substantially free of contact with the at least one track. The temperature sensor may be positioned in a portion of the drive train that is in contact with the at least one track or is positioned in a portion of the track system that is contact with the at least one track.

The vehicle control system may be configured to restrict the speed of the vehicle below a maximum speed of the vehicle when the track temperature is approaching a maximum temperature of the at least one track.

The temperature sensor may be configured to wirelessly transmit the track temperature to a receiver, which may be communicatively connected to the vehicle control system. The receiver may be wirelessly connected to the vehicle control system.

The track system may include two tracks or four tracks, where each of the tracks includes at least one temperature sensor or where each of the tracks may include a plurality of temperature sensors. Alternatively, more than one track but less than all tracks can include at least one temperature sensor.

The vehicle may also include a load sensor for sensing a vehicle load and the vehicle control system can be configured to restrict the speed of the vehicle based on the track temperature and on the vehicle load.

According to an aspect of the present disclosure, a method for controlling a work vehicle including at least one track is disclosed. The work vehicle may be capable of traveling at a maximum speed. The method can include monitoring a track temperature of the at least one track, and restricting the speed of the work vehicle to a restricted speed based on the track temperature, wherein the restricted speed is less than the maximum speed. The method may also include determining if the track temperature is approaching a failure limit based on the track temperature and restricting the speed of the work vehicle based on the determination. The method may also include providing an alert to an operator of the vehicle. The method may also include determining that at least one track is misaligned. An alert may be provided to the operator of the vehicle that the at least one track is misaligned. The method may also include removing the speed restriction when the track temperature lowers.

According to an aspect of the present disclosure, a track system is disclosed that can include a track, a track temperature sensor configured to sense a track temperature of the track and a controller connected to the track temperature sensor, the controller configured to restrict a speed of a vehicle based on the track temperature.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

As will become apparent from the disclosure herein, the disclosed vehicle control system with track temperature monitoring may be used in a variety of settings and with a variety of work machines.

Figure 1:
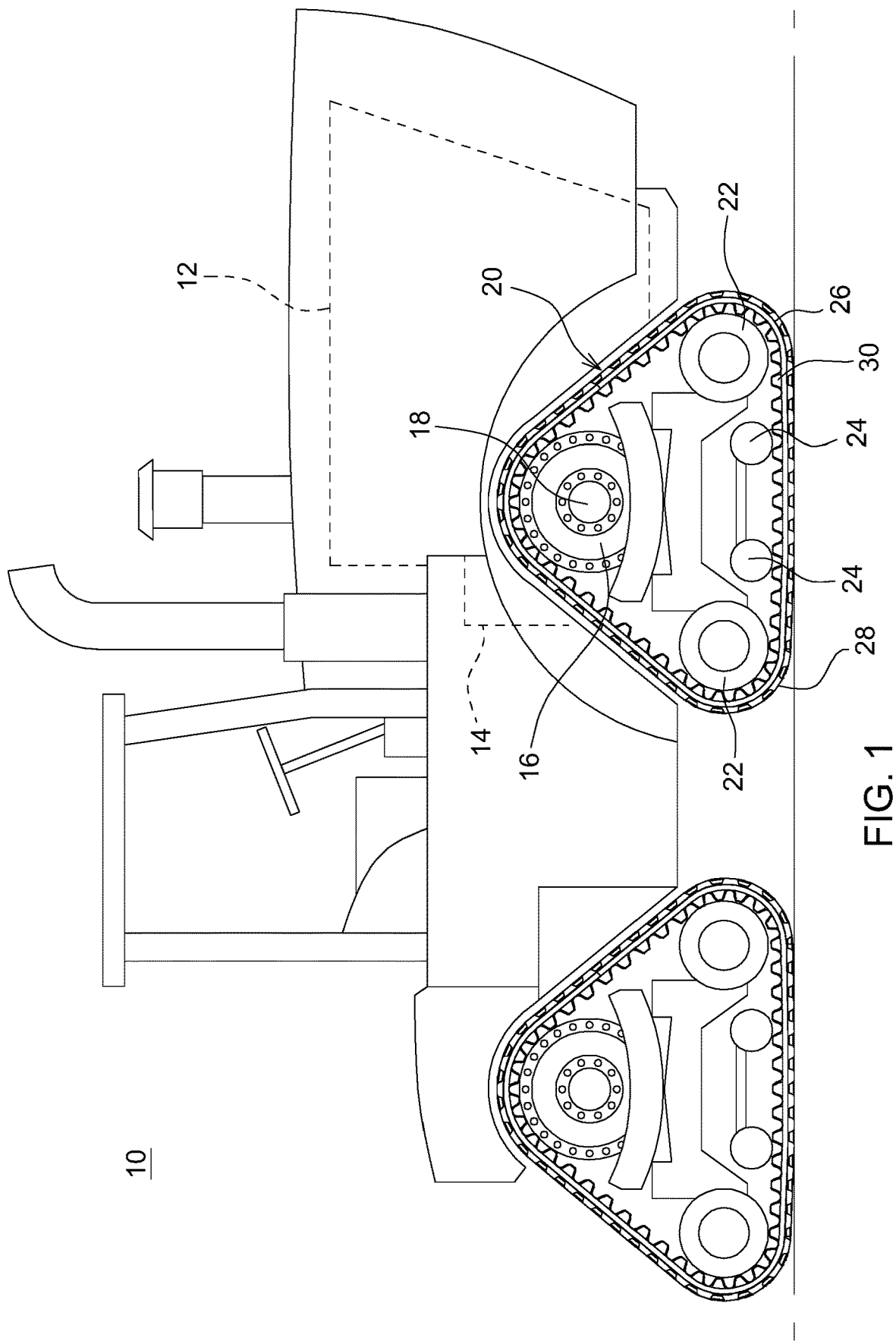
FIG. 1 is a side view of an exemplary vehicle in which the disclosed vehicle control system with track temperature monitoring may be implemented.

For example, referring now to FIG. 1, vehicle 10 is depicted as an articulated four-track tractor with power source 12 (e.g., an internal combustion engine) and drive train 14. Vehicle 10 may have four track drives, each having a drive wheel 16, rotating about axle 18 and providing motive power to endless track 20 to propel vehicle 10 on the ground. Drive wheel 16 and axle 18 are driven by drive train 14 such that drive train 14 transmits motive power from the power source 12. Endless track 20 also engages idler wheels 22 and bogie wheels 24 of the track drives. Bogie wheels 24 can also be referred to as mid-rollers. It will be understood that other configurations may be possible. For example, there may be two tracks instead of four or there may be a combination of ground engaging wheels, tandems, and/or tracks. drive train 14 may also include electric generators and/or drives for providing motive power to the track drives.

Figure 5:
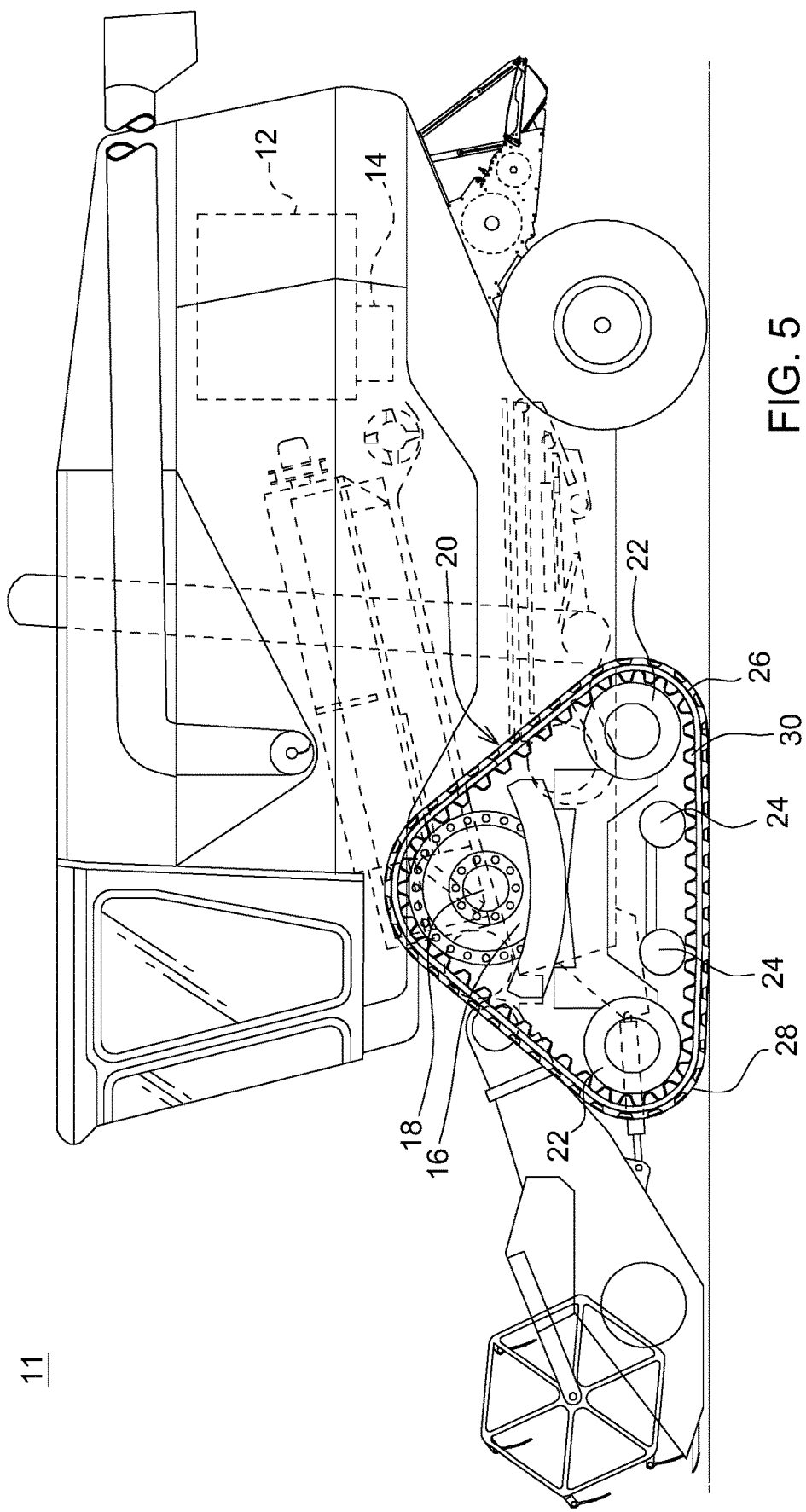
FIG. 5 is a side view of a second exemplary vehicle in which the disclosed vehicle control system with track temperature monitoring may be implemented.

As another example of a work vehicle, and referring to FIG. 5, vehicle 10 is depicted as an agricultural combine with power source 12 (e.g. an internal combustion engine) and drive train 14. Vehicle 10 may have two track drives, each having a drive wheel 16 rotating about axle 18 and providing motive power to endless track 20 propel vehicle 10 on the ground. Drive wheel 16 and axle 18 are driven by drive train 14 such that the drive train 14 transmits motive power from the power source 12. In this endless track 20 also engages idler wheels 22 and bogie wheels 24 of the track drives. Bogie wheels 24 can also be referred to as mid-rollers. It will be understood that other configurations may be possible. For example, there may be four tracks instead of two to track +2 wheel arrangement shown in FIG. 5. Further, the drive train 14 may include electric or hydraulic drives, gear reduction arrangements or planetary gear arrangements, for providing motive power to the track drives.

Drive train 14 (see e.g. FIG. 5) may comprise a hydraulic pump driven by the power source 12 that in turn drives a hydraulic motor that drives the drive wheels 16. Alternatively, drive train 14 may comprise an electric motor driven by the power source 12 that in turn drives an electric motor that drives the drive wheels 16.

Endless track 20 is an endless track having an elastomeric body 26, an outer side 28 displaying a series of ground engaging profiles and an inner side 30 displaying a series of drive lugs adapted to be engaged by drive sprockets on drive wheel 16 of vehicle 10. In view of its underlying nature, the elastomeric body 26 can be referred to as a "carcass." The elastomeric body 26 is elastomeric in that it comprises elastomeric material. The elastomeric material can be any polymeric material with the property of elasticity. In this case, the elastomeric material of the elastomeric body 26 includes rubber. Various rubber compounds may be used and, in some cases, different rubber compounds may be present in different areas of the elastomeric body 26. In other cases, the elastomeric material of the elastomeric body 26 may include another elastomer in addition to or instead of rubber (e.g., polyurethane elastomer). The elastomeric body 26 can comprise one or more reinforcements embedded in its elastomeric material. For example, one such reinforcement may be a layer of reinforcing cables (e.g., cords or wire ropes) that extend generally in the longitudinal direction of the endless track 20 to enhance its strength in tension along its longitudinal direction. Another example of a reinforcing member is a layer of reinforcing fabric that comprises pliable material made usually by weaving, felting, or knitting natural or synthetic fibers (e.g., a ply of reinforcing woven fibers).

The ground engaging profiles comprise a plurality of traction projections (sometimes referred to as "traction lugs", "drive treads," "tread members" or "tread bars") distributed on the ground-engaging outer side 28. Each of the traction projections can have an elongated shape and can be angled relative to the longitudinal direction of the endless track 20. The traction projections of the ground engaging profiles may have various other shapes in other examples (e.g., curved shapes, shapes with straight parts and curved parts, etc.). Ground engaging profiles can comprise elastomeric material. The elastomeric material of the ground engaging profiles can be any polymeric material with suitable elasticity, such as rubber. Various rubber compounds may be used and, in some cases, different rubber compounds may be present in different areas of the ground engaging profiles. In other embodiments, the elastomeric material of at least some of the ground engaging profiles may include another elastomer in addition to or instead of rubber.

The inner side 30 of the endless track 20 contacts the drive wheel 16 in order to cause motion of the endless track 20 around the idler wheels 22 and bogie wheels 24. The idler wheels 22 and/or bogies can help support part of the weight of the vehicle 10 on the ground via the endless track 20, guide the endless track 20 as it is driven by the drive wheel 16, and/or tension the endless track 20. Drive lugs extend inwardly from the inner side 30 of endless track 20 and engage the drive wheel 16. Drive lugs also help to guide the endless track 20 as it is driven by drive wheel 16 to help prevent undesired lateral movement or de-tracking of endless track 20. Drive lugs can interact with idler wheels 22 to guide the endless track 20. Drive lugs can be considered to be drive or guide projections in that they help with the driving and the guiding of endless track 20. Drive lugs can each comprise elastomeric material. The elastomeric material of the drive lugs can be any polymeric material with suitable elasticity, such as rubber. Various rubber compounds may be used and, in some cases, different rubber compounds may be present in different areas of the drive lugs. In other embodiments, the elastomeric material of at least some of the drive lugs may include another elastomer in addition to or instead of rubber.

Additionally, the inner side 30 of endless track 20 can be also frictionally driven by drive wheel 16 such that friction between inner side 30 and drive wheel 16 helps to cause motion of the endless track 20. In some embodiments, endless track 20 may not include drive lugs, or may include smaller guide lugs, and the endless track 20 may be driven mostly via friction with the drive wheel 16.

The drive wheel 16 rotates when the axle 18 rotates when being driven by drive train 14. Rotation of the drive wheel 16 rotates the endless track 20 and causes vehicle 10 to be propelled on the ground. Vehicle 10 has a maximum transport operational speed (e.g., SpeedMax) as designed for normal operation or determined through testing in normal conditions. Endless track 20 may heat up due to any combination of friction caused by speed, friction caused by the type of ground surface (e.g., heat builds up more in ground engaging profiles on paved roads), friction caused by the load on the vehicle 10 (e.g., higher load carried by a hitch of vehicle 10 results in increased friction), and/or friction caused by misalignment with the drive wheel 16, the idler wheels 22, and/or the bogie wheels 24. Endless tracks 20 that are overheated may fail (e.g., break or tear) or may be more easily misaligned or otherwise negatively impact the performance of vehicle 10. To prevent a failure of endless track 20 or other negative performance impact, a vehicle control system 200 shown in FIG. 2 monitors a track temperature T-Track of endless track 20 and can restrict the maximum operational speed based on the track temperature T-Track (e.g., RestrictedSpeedMax).

Vehicle control system 200 includes a vehicle controller 202 that is connected to an operator input 204, to an engine 206, and a drive train 208. The engine 206 and drive train 208 provide motive power to at least one track drive 210. The operator input 204 is used to request or command by the operator the vehicle controller 202 to operate at a certain speed, a certain engine RPM in a certain gear, or otherwise provide inputs to the vehicle controller 202 that cause the vehicle 10 to travel at a speed. Alternately, a guidance program/logic or a remote command can be used to command the vehicle 10 at a speed, RPM/gear, etc. Vehicle controller 202 can determine or sense the speed of vehicle 10, or receive speed information from another sensor, as is known by a person of ordinary skill in the art.

Track drive 210 includes a track 212, such as the endless track 20 described above. Track 212 includes drive lugs 214. Track 212 includes a track sensor 216 to monitor the track temperature of track drive 210. For example, track sensor 216 can be embedded, or positioned at least partially, in a drive lug 214-S. In alternate embodiments, track sensor 216 may be embedded or at least partially positioned in the carcass or tread bar. Track sensor 216 wirelessly transmits track temperature information via a suitable wireless protocol (e.g., proprietary or standardized) to a sensor transceiver 218. Sensor transceiver 218 may be a special purpose transceiver or receiver or may be a wireless protocol receiver or transceiver such as Bluetooth or NFC. Vehicle controller 202 is connected to the sensor transceiver 218 (e.g., by a CAN or LIN bus or by a wireless protocol) and receives the track temperature information. Based on the track temperature information, vehicle controller 202 is configured to restrict an operating speed of vehicle 10 when the track temperature approaches component failure levels. For example, the vehicle controller 202 could use lookup tables to determine a maximum allowed operating speed at a given track temperature. The lookup tables, or other logical configuration, could use additional information such as vehicle or hitch loading in addition to track temperature.

Track sensor 216 may be positioned in the track 212 such that it provides temperature information about a portion of the track 212 that is less warm than other portions of the track 212. Vehicle controller 202 can be configured with logic to control vehicle speed with this temperature information even though it is not the temperature information for the warmest part of the track 212. Or the track temperature data from one part of the track can be correlated to another part of the track. Alternately, track sensor 216 can sense a temperature of a part of the vehicle that is in contact with track 212, such as an axle or the drive wheel, and the vehicle controller 202 can correlate the sensed temperature to a track temperature. Testing and monitoring of track temperature data can be used to logically configure the vehicle controller 202 and correlate track temperature information.

Track sensor 216 could be a tire pressure monitor sensor that senses temperature or is modified to sense temperature. Track sensor 216 can be a thermocouple and include wires that are positioned in the track 212. Track sensor 216 can be powered by a rechargeable battery that can be recharged during operation of the vehicle (e.g., inductively charged by an inductive charging transmitter or thermoelectrically charged by a thermoelectric circuit in the track). For example, the sensor transceiver 218 could also serve to inductively charge track sensor 216.

Alternately, the track sensor 216 may also be a pyrometer (e.g., an infrared thermometer) or other remote sensing device that can measure the temperature of a surface of the track 212 and provide the temperature information to the vehicle controller 202. Such a sensor could be positioned on the track drive unit or on the vehicle, such as within the undercarriage. Such a sensor may be connected by wires, data bus, wireless connection, or other suitable communication mechanism.

Vehicle controller 202 may be connected to an operator alerting device 220 inside the cab. The vehicle controller 202 may cause the operator alerting device 220 to alert to the operator a warning message or signal in addition to or instead of restricting the operating speed of vehicle 10. The vehicle controller 202 may also inform the operator on operator alerting device 220 when the speed restriction has been removed or revised or that the temperature warning parameters have subsided. In alternate embodiments, vehicle control system 200 may be configured to provide alerts to the operator alerting device 220 to enable the operator to make decisions on controlling the speed of vehicle 10 instead of directly controlling the speed (e.g., open loop control). In other embodiments, the vehicle controller 202 may alert the operator to control the speed prior to initiating automatic speed restrictions. The vehicle controller 202 may also alert the operator that a track temperature condition has subsided and prompt the operator that the vehicle speed may be increased.

Figure 3:
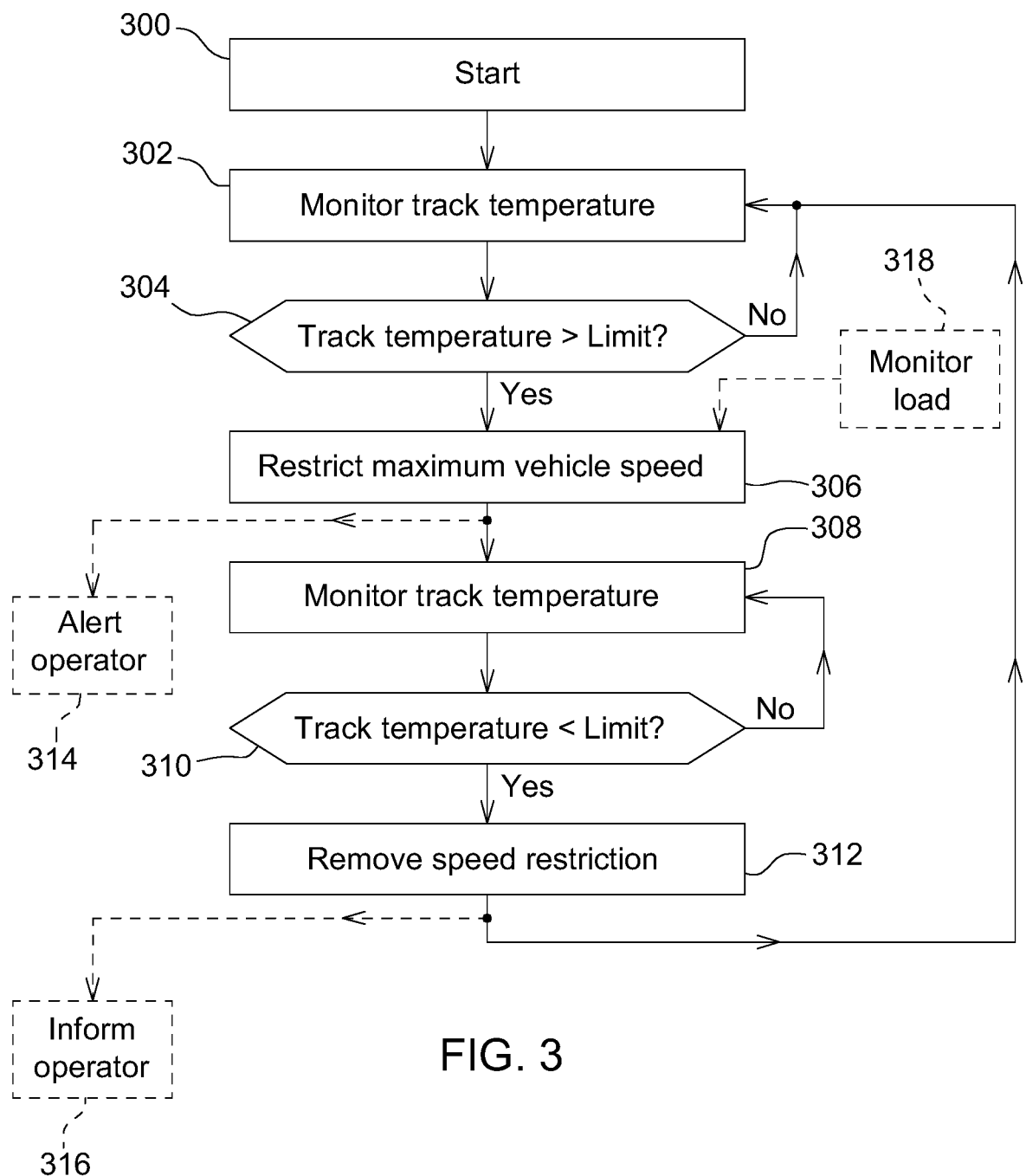
FIG. 3 is a flow diagram showing operations for the control system of FIG. 2.

Referring now to the flow chart of FIG. 3, when the vehicle 10 is operating, the vehicle control system 200 implements control logic starting at step 300. At step 302, the vehicle controller 202 monitors and/or determines the track temperature T-Track provided by the at least one track sensor 216. At step 304, the vehicle controller 202 determines if the T-Track is above a temperature limit (e.g., T-Limit) that may be pre-configured or determined based on vehicle operating conditions or operating parameters. If T-Track is loss than the T-Limit, then the controller returns to step 302 to continue monitoring T-Track. If T-track is more than the T-Limit, or is approaching another track failure limit or range, the controller proceeds to step 306 to restrict the maximum vehicle speed to the RestrictedSpeedMax. The vehicle controller 202 limits the speed of travel of the vehicle 10 to the RestrictedSpeedMax. The vehicle controller 202 then proceeds to step 308 to continue to monitor the T-Track and at step 310 evaluates if the T-Track returns to a temperature below the T-Limit. If the T-Track remains above the T-Limit, the vehicle controller 202 returns to step 308. If the T-Track goes below the T-Limit, the vehicle controller 202 proceeds to step 312 to remove the speed restriction and the vehicle 10 may travel at SpeedMax if so commanded. The vehicle controller 202 proceeds from step 312 back to step 302 to continue monitoring the T-track. If the sensor fails to provide a T-Track or if there is another error, the vehicle controller 202 can restrict the speed of the vehicle 10.

Alternately, instead of removing the speed restriction at step 312 the vehicle controller 202 may revise the RestrictedSpeedMax (e.g., RevisedRestrictedSpeedMax) to a faster speed (or a slower speed) that is less than or equal to the SpeedMax of vehicle 10. In other words, there may be different RestrictedSpeedMax settings for different T-Tracks or T-Track ranges or the vehicle controller 202 may determine that further reduction in speed is required to prevent sub-optimal operation of the track 212. For example, vehicle controller 202 could progressively step down or step up vehicle speeds based on T-track or utilize other suitable control logic to control vehicle speed based on track temperature.

In alternate embodiments, the vehicle controller 202 can also proceed from step 306 to step 314 to alert the operator and provide a track temperature warning. Such an alert may alert the operator that the speed of vehicle 10 has been restricted and/or may instruct the operator to command a slower speed. Other suitable alerts may be used. Furthermore, the vehicle controller 202 may proceed to step 316 from step 312 to inform the operator that the speed restriction has been removed and/or revised.

Changes in track temperature may indicate that the track is misaligned. For example, a sensor in a drive lug could be used to detect such misalignment as the drive lug interacts with the drive wheel. Vehicle controller 202 may alert at step 314 that the track 212 may be experiencing such a misalignment condition. In some embodiments, the vehicle controller 202 can be configured to provide a misalignment warning prior to restricting the speed of vehicle 10. If the temperature of each track of a multi-track vehicle is monitored, the vehicle controller 202 may be configured to alert the operator which specific track or tracks are experiencing misalignment conditions. In additional embodiments, the vehicle controller 202 may alert a track alignment controller to automatically adjust or correct the track alignment.

The vehicle control system 200 may further include at least one load sensor 222 that senses a load on vehicle 10. For example, load sensors 222 could be used on the axles to determine the load on vehicle 10. Load sensors 222 could also be used on the hitch or drawbar to sense the load on the vehicle 10. Vehicle controller 202 could be configured to take into account the vehicle load and track temperature when determining whether to restrict the operating temperature of the vehicle 10. The vehicle load could also be used to provide misalignment warnings. For example, the vehicle controller 202 could alarm the operator of a track misalignment if the track temperature increases when the vehicle 10 is not under a large load. For example, the vehicle controller 202 could monitor the vehicle load in step 318 and utilize this information in step 306 to help determine whether to restrict the vehicle speed, to help determine the optimum speed restriction, or to determine whether to issue a misalignment warning or other warning.

Figure 2:
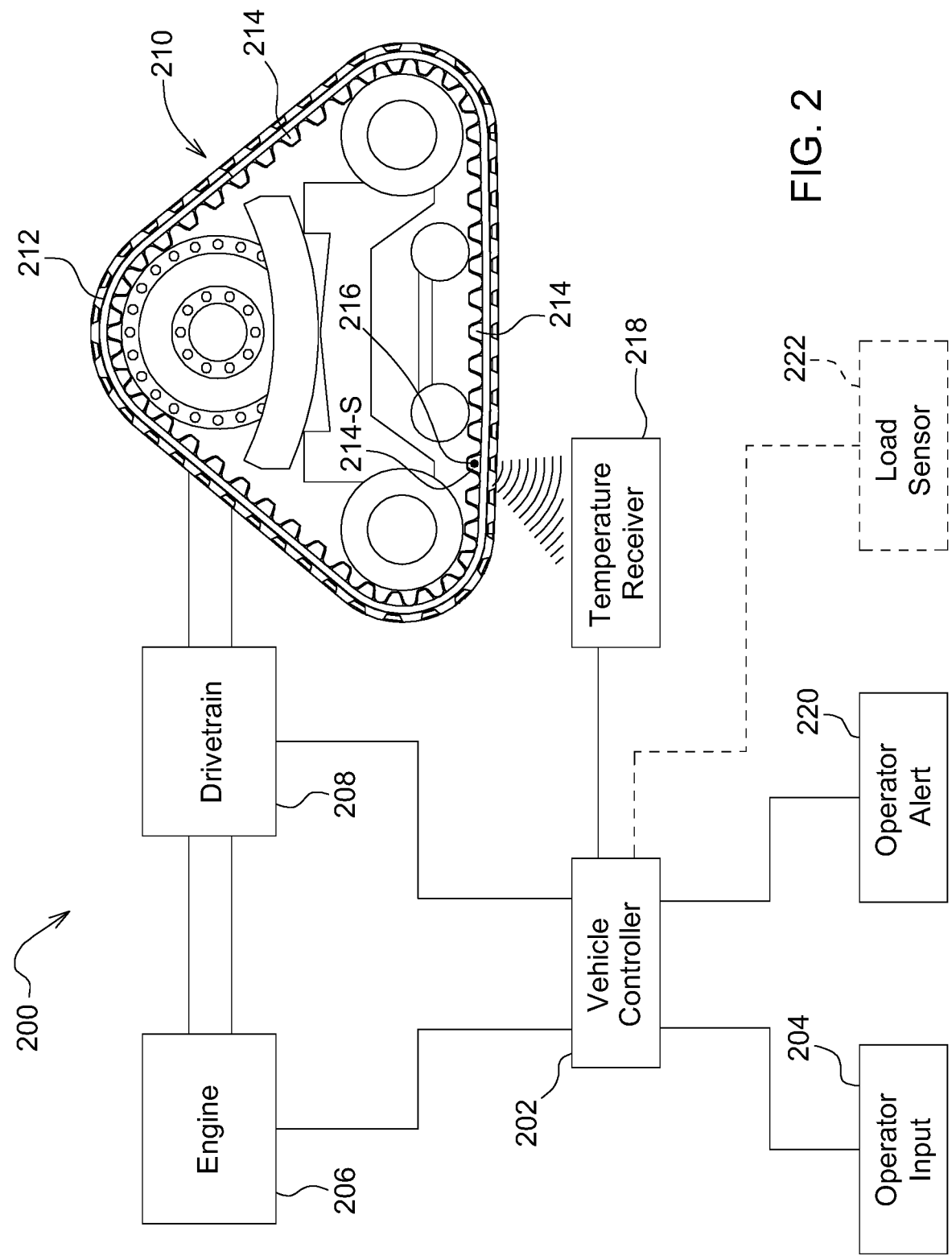
FIG. 2 is a schematic diagram of a control system for the vehicle of FIG. 1.
Figure 4:
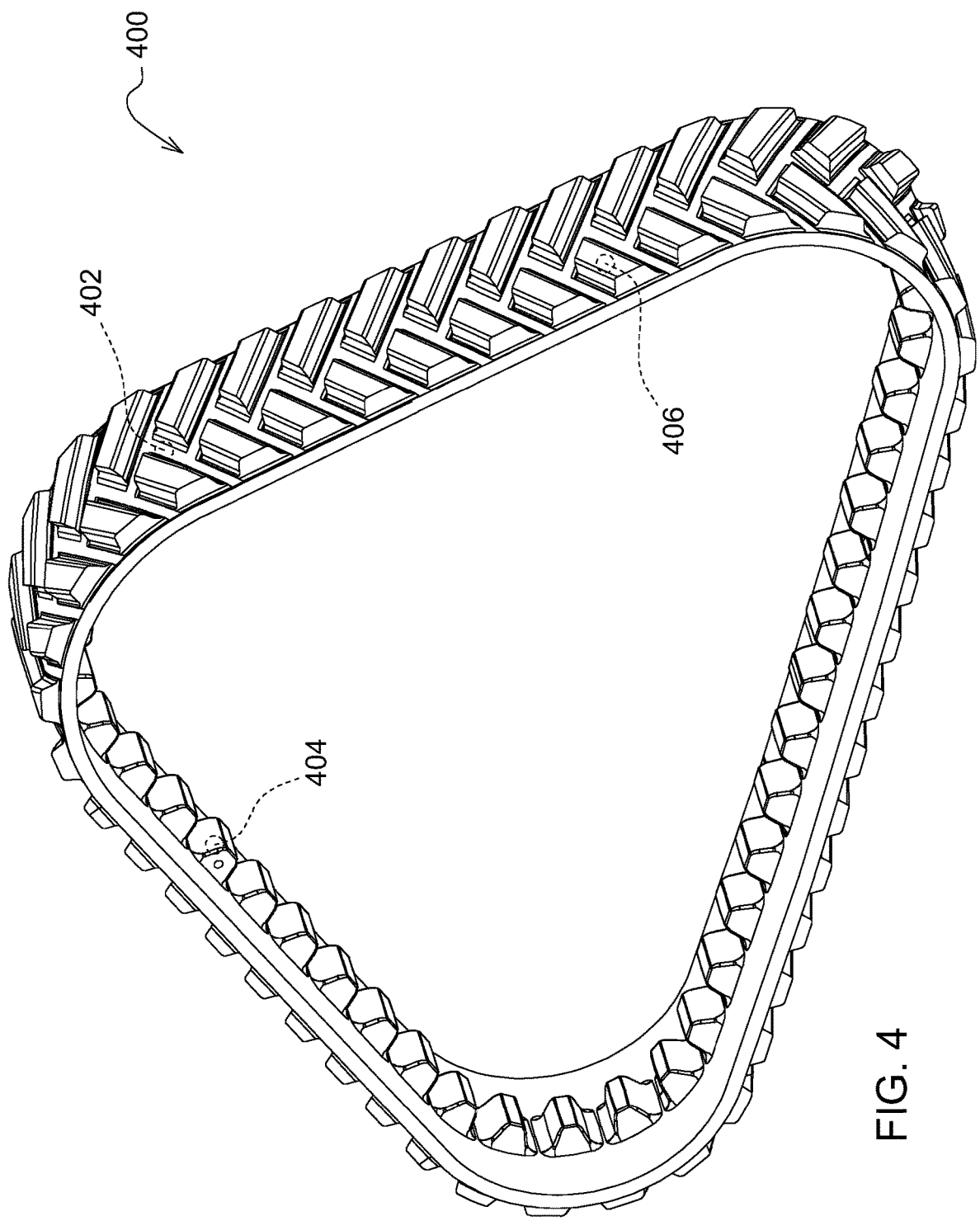
FIG. 4 is a perspective view of a track of the vehicle of FIG. 1.

Referring now to FIG. 4, a track 400, such as endless track 20 shown in FIG. 1 or track 212 shown in FIG. 2, can include a sensor 402 positioned in the carcass, or body, of the track 400, a sensor 404 positioned in a drive lug of the track 400, and/or a sensor 406 positioned in a tread bar of the track. Positioning of a sensor within the track 400 may be based on the hottest spot(s) in the track 400 as determined by testing, may be based on placing the sensor in a spot that reduces wear and tear on the sensor (e.g., loading), may be based on maximizing signal from the sensor, or other considerations such as battery charging location or location where the sensor can be replaced if the unit requires replacement. If the sensor is not placed in a hot spot, the temperature data can be correlated to a hot spot temperature. Sensors may be placed in one track of a multitrack machine, a combination of tracks, or in all tracks. A sensor in a tread bar may more directly sense track temperature issues; however, the tread bars may operate under a higher operating load than a drive lug. The sensors could be inserted into a plug in the track, molded within the track, or otherwise suitably positioned to sense track temperature.

Without in any way limiting the scope, interpretation, or application of the claims appearing below, a technical effect of one or more of the example embodiments disclosed herein is using smart speed control to allow the vehicle to operate at maximum speeds instead of using a blanket worst case speed restriction to prohibitively restrict speeds even when the track temperature is not problematic. Another technical effect of one or more of the example embodiments disclosed herein is a sensing and warning system for track misalignment.

As used herein, "controller" is intended to be used consistent with how the term is used by a person of skill in the art, and refers to a computing component with processing, memory, and communication capabilities which is utilized to control or communicate with one or more other components. In certain embodiments, a controller may also be referred to as a control unit, vehicle control unit (VCU), engine control unit (ECU), transmission control unit (TCU), or hydraulic, electrical or electro-hydraulic controller. In certain embodiments, a controller may be configured to receive input signals in various formats (e.g., hydraulic signals, voltage signals, current signals, CAN messages, optical signals, radio signals), and to output command signals in various formats (e.g., hydraulic signals, voltage signals, current signals, CAN messages, optical signals, radio signals).

Embodiments of the present disclosure may be described herein in terms of logical block components and various steps, including in flow charts. It should be appreciated that such block components and steps may be realized by any number of appropriately-configured hardware, logic, software, and/or firmware components. For example, an embodiment of the present disclosure may employ various software logic, firmware, and/or integrated circuit components (e.g., memory elements, digital signal processing elements, logic elements, look-up tables) which may carry out a variety of logical steps under the control of one or more microprocessors or other control devices. In addition, those skilled in the art will appreciate that embodiments of the present disclosure may be practiced in conjunction with any number of systems, and that the vehicle 10 described herein is merely one exemplary embodiment of the present disclosure. Further, although certain embodiments of the disclosure are illustrated as a flowchart, the disclosure is not limited to such steps and the order of steps presented, and it would be well within the skill of one of ordinary skill in the art to reorder, combine, or split many of the steps and achieve the same result.

As used herein, "e.g." is utilized to non-exhaustively list examples, and carries the same meaning as alternative illustrative phrases such as "including," "including, but not limited to," and "including without limitation."

As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C).

As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

For the sake of brevity, conventional techniques and arrangements related to signal processing, data transmission, signaling, control, and other aspects of the systems disclosed herein may not be described in detail. Furthermore, the connecting lines shown in the various figures contained herein are intended to represent example relationships and/or connections between the various elements (e.g., electrical power connections, communications, and physical couplings). It should be noted that many alternative or additional relationships or connections may be present in an embodiment of the present disclosure.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

The invention claimed is:

1. A work vehicle comprising:
an engine;
a drive train driven by the engine;
a track system including at least one track, the track system connected to the drive train;
a temperature sensor configured to sense a track temperature of the at least one track; and
a vehicle control system configured to receive the track temperature and configured to determine misalignment of the at least one track based at least in part upon the sensed track temperature.

2. The work vehicle of claim 1, further comprising an operator alerting apparatus for alerting an operator of a speed condition or a track condition.

3. The work vehicle of claim 1, wherein the vehicle control system is configured to restrict the speed of the work vehicle based on the track temperature.

4. The work vehicle of claim 1, wherein the vehicle control system limits the speed of the work vehicle based at least in part upon the sensed track temperature.

5. The work vehicle of claim 1, wherein the at least one track comprises a carcass, a plurality of treads, and a plurality of lugs, and wherein the temperature sensor is positioned at least partially within at least one of a group comprising at least one of the plurality of lugs, at least one of the plurality of treads, and the carcass.

6. The work vehicle of claim 1, wherein the temperature sensor is a non-contact sensor that is substantially free of contact with the at least one track.

7. The work vehicle of claim 1, wherein the temperature sensor is positioned in a portion of the drive train that is in contact with the at least one track or is positioned in a portion of the track system that is in contact with the at least one track.

8. The work vehicle of claim 1, wherein the vehicle control system is configured to restrict the speed of the work vehicle below a maximum speed of the vehicle when the track temperature is approaching a maximum temperature of the at least one track.

9. The work vehicle of claim 1, wherein the temperature sensor is configured to wirelessly transmit the track temperature to a receiver, and wherein the receiver is communicatively connected to the vehicle control system.

10. The work vehicle of claim 9, wherein the receiver is wirelessly connected to the vehicle control system.

11. The work vehicle of claim 1, wherein the track system includes two tracks or four tracks, and wherein each of the tracks includes at least one temperature sensor.

12. The work vehicle of claim 1, wherein each of the at least one tracks includes a plurality of temperature sensors.

13. The work vehicle of claim 1, further comprising a load sensor for sensing a vehicle load, wherein the vehicle control system is configured to determine misalignment of the at least one track based on a combination of the track temperature and the vehicle load.

14. A method for controlling a work vehicle including at least one track, wherein the work vehicle is capable of traveling at a maximum speed, the method comprising:
monitoring a track temperature of the at least one track; and
determining that the at least one track is misaligned based at least in part upon a monitored track temperature of the at least one track.

15. The method of claim 14, further comprising:
determining if the track temperature is approaching a failure limit based on the track temperature and restricting the speed of the work vehicle based on the determination.

16. The method of claim 14, further comprising providing an alert to an operator of the vehicle that the at least one track is misaligned.

17. A track system comprising:
a track;
a track temperature sensor configured to sense a track temperature of the track; and
a controller connected to the track temperature sensor, wherein the controller is configured to determine misalignment of the track based at least in part upon the track temperature.

18. The track system of claim 17, wherein the controller is to restrict a speed of the work vehicle based upon the track temperature sensed by the track temperature sensor.

19. The track system of claim 17, wherein the controller is to output a misalignment warning prior to restricting the speed of the work vehicle based upon the track temperature sensed by the track temperature sensor.

20. The track system of claim 17 further comprising a load sensor to sense a vehicle load, wherein the controller is to determine misalignment of the track based upon a combination of the track temperature and the vehicle load sensed by the load sensor.

* * * * *